(12) United States Patent
Kanter (10) Patent No.: US 11,588,557 B2
(45) Date of Patent: Feb. 21, 2023

(54) APPARATUS AND METHOD FOR SHIFTING A FREQUENCY OF AN OPTICAL SIGNAL

(71) Applicant: NuCrypt, LLC, Park Ridge, IL (US)

(72) Inventor: Gregory S. Kanter, Chicago, IL (US)

(73) Assignee: Nucript LLC, Evanston, IL (US)

( * ) Notice: Subject to any disclaimer, the term of this patent is extended or adjusted under 35 U.S.C. 154(b) by 0 days.

(21) Appl. No.: 17/684,520

(22) Filed: Mar. 2, 2022

(65) Prior Publication Data

US 2022/0286210 A1 Sep. 8, 2022

Related U.S. Application Data

(60) Provisional application No. 63/155,499, filed on Mar. 2, 2021.

(51) Int. Cl.
| | |
|---|---|
| *H04B 10/572* | (2013.01) |
| *H04B 10/61* | (2013.01) |
| *H04B 10/50* | (2013.01) |
| *H04B 10/2557* | (2013.01) |
| *H04B 10/556* | (2013.01) |
| *H04B 10/67* | (2013.01) |
| *H04B 10/291* | (2013.01) |

(52) U.S. Cl.
CPC ..... *H04B 10/6163* (2013.01); *H04B 10/2557* (2013.01); *H04B 10/291* (2013.01); *H04B 10/505* (2013.01); *H04B 10/5561* (2013.01); *H04B 10/572* (2013.01); *H04B 10/677* (2013.01)

(58) Field of Classification Search
None
See application file for complete search history.

(56) References Cited

U.S. PATENT DOCUMENTS

| | | | | |
|---|---|---|---|---|
| 5,386,314 | A * | 1/1995 | Jopson | G02F 1/397 359/332 |
| 5,504,610 | A * | 4/1996 | Bulow | G02F 1/3538 398/205 |
| 6,509,987 | B1 * | 1/2003 | Hunziker | H04B 10/291 398/79 |
| 6,529,314 | B1 * | 3/2003 | Shukunami | H01S 3/06754 359/332 |
| 6,665,113 | B2 * | 12/2003 | Aso | H04J 14/02 385/24 |

(Continued)

*Primary Examiner* — Jai M Lee
(74) *Attorney, Agent, or Firm* — Nadya Reingand; Yan Hankin (57) ABSTRACT

A system and method for applying a time-varying phase shift to an optical signal is described. Such a phase shift results in a frequency shift of the optical signal, which can be useful for instance in sensing applications. The design uses cross phase modulation (XPM) in a nonlinear medium such as optical fiber. The pump producing the XPM experiences a change in energy along the medium, for instance due to loss. The pump and signal have mismatched group velocities such that they walk-off each other in time, and the pump pulse repetition rate is chosen so that it has a specific relationship with respect to the walk-off. The design is compatible with very low signal loss and does not require high fidelity electrical control signals. It is capable of high-efficiency one-directional serrodyne frequency shifts, as well as producing symmetric frequency shifts. It can also be made polarization independent.

20 Claims, 9 Drawing Sheets

(56) References Cited

U.S. PATENT DOCUMENTS

| | | | | |
|---|---|---|---|---|
| 7,164,526 B2* | 1/2007 | McKinstrie | ............. | G02F 1/395 |
| | | | | 330/4.5 |
| 7,304,788 B2* | 12/2007 | McKinstrie | ............ | G02F 1/3536 |
| | | | | 359/332 |
| 7,388,710 B2* | 6/2008 | Ono | ......................... | G02F 1/395 |
| | | | | 359/326 |
| 7,408,701 B2* | 8/2008 | Aso | ......................... | H04B 10/29 |
| | | | | 398/92 |
| 8,773,753 B2* | 7/2014 | Kato | ...................... | G02F 1/395 |
| | | | | 359/337.2 |
| 9,941,994 B2* | 4/2018 | Croussore | .......... | H04B 10/6161 |
| 10,536,218 B2* | 1/2020 | Andrekson | ........ | H04B 10/1125 |
| 10,634,974 B2* | 4/2020 | Shukunami | ......... | H01S 3/06712 |
| 10,735,128 B1* | 8/2020 | Esman | ............... | H04B 10/2575 |
| 10,948,802 B2* | 3/2021 | Nakagawa | .............. | G02F 2/004 |
| 11,438,086 B2* | 9/2022 | Akasaka | ............. | H04B 10/294 |
| 11,482,834 B1* | 10/2022 | Pomeranz | ............. | H01S 5/0428 |
| 2020/0200973 A1* | 6/2020 | Yamauchi | ............. | H01S 3/0092 |
| 2022/0060273 A1* | 2/2022 | Kato | ................... | H04B 10/675 |
| 2022/0286210 A1* | 9/2022 | Kanter | .............. | H04B 10/2557 |

* cited by examiner

APPARATUS AND METHOD FOR SHIFTING A FREQUENCY OF AN OPTICAL SIGNAL

FIELD

The present disclosure generally relates to the field of photonic signal processing. In particular, the present disclosure relates to an apparatus and method for shifting a frequency of a optical signal in a low-loss manner.

BACKGROUND

There are multiple ways of shifting the optical frequency of an optical signal. A common tool for optical-frequency shifting is an electro-optic (EO) phase modulator (PM). For instance, applying a sinusoidal phase modulation at a frequency $f_m$ to a single-frequency optical input at $f_o$ (e.g., a laser) will transfer some of the optical field to frequencies of $f_o \pm n \cdot f_m$, where n is the integer. A temporally symmetric sinusoidal waveform also generates a temporally symmetric spectral profile, with equal amounts of the signal transferred to $+n \cdot f_m$ and $-n \cdot f_m$. The magnitude of the signal at each new tone follows a Bessel function progression, but for small phase changes of $m \cdot \sin(f_m \cdot t)$, where m is the modulation index, and m<0.2, only the first-order (n=1) tones dominate and the relative optical intensity (where unity represents 100% of the optical power) at each first-order tone can be approximated by $(m/2)^2$. For instance, for m=0.2 about 1% of a carrier power is transferred to each of the first-order tones. The first-order tones reach a maximum at m=1.84, but here a total power in each first-order tone is still <34%. A frequency shifter that transfers power to both positive and negative frequency-shift values in equal magnitude must have <50% of the power in any one frequency tone. Sinusoidal phase modulation is widely used for a number of purposes, for instance using small m for locking lasers to a cavity, or at large m as part of a scheme to generate many optical comb lines. One of the appeals of the sinusoidal phase modulation is the ease that it can be applied, since sinusoidal electrical drive signals are common and the broad-band frequency response of an electrical modulation signal or of the phase modulator is not required.

It is also possible to use the phase modulator to shift >50%, in theory up to 100%, of an incoming optical power to a new frequency, using a process referred to as serrodyne frequency shifting [see, e.g., Johnson, Leonard M., and Ch H. Cox. "Serrodyne optical frequency translation with high sideband suppression." *Journal of lightwave technology* 6.1 (1988): 109-112]. Such a process can be useful for instance in various coherent measurement systems, such as lidar. Here, a linear phase ramp is applied to the phase modulator over a repetition period of $T_r$, ideally with the ramp applying an integer number of $2 \cdot \pi$ radians of a phase shift. Since, in practice, the ramp cannot be reset from its maximum to its minimum in infinitesimal time, there is some non-ideality present in such a frequency shifter. Generating nearly ramp-like electrical signals to an electro-optical (EO) modulator is possible when the bandwidth of the electrical signal exceeds ($1/T_r$) by a suitable amount, for instance a factor of 10. This need for wide-band high-fidelity electrical driving signals limits the frequency shift that can be accomplished with a given bandwidth modulation system.

Another limitation of the EO phase modulators, particularly fast waveguide-based fiber-coupled phase modulators, is that they tend to have substantial insertion loss, thus causing an output optical signal to have a smaller output power than an input optical signal. Moreover, the EO phase modulators also tend to be polarization insensitive. One can achieve polarization insensitivity, for instance by cascading two modulators with their phase-modulation axis oriented at 90 degrees [see, e.g., U.S. Pat. No. 6,148,122, 14 Nov. 2000], but for efficient waveguide-based modulators this can double the insertion loss. A 10 GHz bandwidth fiber-coupled EO phase modulator may typically have 2.5 dB insertion loss, so cascading two such phase modulators to achieve polarization independence could then have aggregate 5 dB insertion loss.

Other types of the phase modulators can perform serrodyne frequency shifting, potentially in a polarization independent way, but typically such mechanisms, for instance thermal phase shifts, are much slower than EO methods and thus are capable of inducing only small frequency shifts, such as <1 MHz. This is a too small of a frequency shift for many applications.

A more common frequency shifter is an acousto-optic modulator (AOM). AOMs can have reasonably low loss and polarization independence. For instance, a ~200 MHz AOM can have 2.5 dB loss and operate with polarization independence. The AOMs typically require large electrical driving signals >1 W. While they can attain frequency shifts >250 MHz, models with a higher magnitude frequency shift also tend to be accompanied by higher insertion loss. Also, the AOMs typically only have one operating frequency mode, where, for instance, an input optical signal is shifted by some fixed frequency, as opposed to phase modulators that can be used to either shift the frequency a fixed amount or to generate symmetric sidebands around an original frequency.

Carrier suppressed frequency shifting can be performed with a Mach-Zehnder Interferometer (MZI) biased so as to extinguish a carrier frequency [see, for example, U.S. Pat. No. 7,266,306 B1, 9 Apr. 2007]. This can put >40% of incoming light into each of the first two tones ($f_o \pm n \cdot f_m$). It is difficult to make such a technique both low loss and polarization independent. More sophisticated modulators, which combine multiple MZIs, can perform various types of functions, including a near 100% single-sideband frequency shift, but again loss and polarization independence is hard to achieve, and complex electronic controls may be required.

For convenience, the term "wavelength conversion" is used herein when an optical frequency is shifted by >100 GHz and a shifted spectrum is not significantly altered after said shifting, and the term "frequency shifting" is used herein when the frequency is shifted by <100 GHz and the spectrum may or may not be significantly altered, although technically the wavelength conversion and the frequency conversion can be considered synonymous given that a wavelength λ and a frequency f are related by c=λ·f where c is the speed of light.

Nonlinear optical techniques are commonly used for the wavelength conversion, including via second-order nonlinear interactions like sum-frequency generation and third-order nonlinear interactions like four-wave mixing. Most often these frequency shifts are relatively large (many nanometers of a wavelength shift), which allows for a strong optical pump to be filtered out. To keep optical pump powers down, waveguide structures are preferred. For the second-order nonlinear interactions, this usually means added insertion loss (when interfacing via a fiber optical cable). However, fiber-based nonlinear wavelength conversion systems may require high pump powers and/or a strongly nonlinear fiber and can be complex to build and operate.

A low-noise and low-loss fiber-based cross-phase modulation (XPM) switch has been proposed that switches an input signal between one of two output ports based on a phase shift applied in one arm of an interferometer using XPM [see, for example, U.S. Ser. No. 15/953,626, 16 Apr. 2018]. Typically, a short pump pulse walks-off from the signal pulse while propagating over a nonlinear fiber, creating a nearly fixed square-like phase shift over a given switching window, thereby leading to a constant switching window. Such a switch can be made polarization insensitive by de-polarizing the pump pulse. However, when operating with input signals that are comprised of pulses with a duration smaller than the switching window, it does not alter a signal spectrum.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that allows a frequency of an optical signal to be shifted in a low-loss (e.g., <2 dB) manner in a nonlinear optical medium-coupled (e.g., fiber-coupled) configuration at large shifting frequencies, such as >200 MHz, without requiring specialized high-fidelity and high-bandwidth electrical modulation signals (e.g., ramp functions with fast transitions).

It is a further objective of the present disclosure to implement the technical solution such that it provides polarization independent operation with respect to an optical signal without significantly impacting low insertion loss specification.

It is a further objective of the present disclosure to implement the technical solution such that the carrier frequency of the optical signal is shifted by a nominal amount, where a frequency shift is tunable over some fraction of a mean shifting frequency, such as ±5%.

It is a further objective of the present disclosure to implement the technical solution such that it allows for other transformations, such as the generation of symmetric sideband tones, including the special case of near-complete suppression of an original carrier.

The objectives above are achieved by the features of the independent claims in the appended claims. Further embodiments and examples are apparent from the dependent claims, the detailed description, and the accompanying drawings.

According to a first aspect, an apparatus for shifting a frequency of an optical signal is provided. The apparatus comprises a first input port configured to receive the optical signal and a second input port configured to receive a pump pulse. The apparatus further comprises a wavelength division multiplexer (WDM) coupled to the first input port and the second input port. The WDM is configured to generate a combined signal by combining the optical signal and the pump pulse. The apparatus further comprises a nonlinear optical medium configured to pass the combined signal therethrough. The nonlinear optical medium has a length L. The apparatus further comprises a signal filter configured to receive the combined signal passed through the nonlinear optical medium and to remove the pump pulse from the combined signal but pass the optical signal from the combined signal. The pump pulse has a pump energy changing along the length of the nonlinear optical medium. The pump pulse travels along the nonlinear optical medium at a group velocity that is mismatched with respect to the optical signal by $t_w$ per unit length such that the pump pulse and the optical signal walk-off by a time of $L \cdot t_w$ between an input end and an output end of the nonlinear optical medium. The pump pulse has a repetition rate $R_p=(1\pm0.1)/L \cdot t_w$ and a full-width at a half-maximum equal to $t_p<0.2/L \cdot t_w$. Cross-phase modulation (XPM) results from the pump pulse varying in time with respect to the optical signal due to the pump energy changing along the nonlinear optical medium and the group velocity mismatched between the pump pulse and the optical signal. The XPM causes a time-varying phase shift on the optical signal. The time-varying phase shift is proportional to an energy profile of the pump pulse along the length of the nonlinear optical medium such that a time-varying phase profile is applied to the optical signal. The time-varying phase profile of the optical signal causes a change in a signal spectrum, shifting a portion of an optical power by an amount $|i \cdot R_p|$, where i is an integer. By using the apparatus according to the first aspect, it is possible to generate new spectral frequencies from the optical signal. A common use would be to shift a frequency of a laser signal for making a coherent optical measurement. The apparatus according to the first aspect may be used in various fields involved with sensing optical signals, such as optical spectroscopy, laser vibrometry, and fiber-optic sensing systems.

In one embodiment of the first aspect, the pump pulse has an intensity, and the nonlinear optical medium comprises a nonlinear optical fiber configured to change the intensity of the pump pulse along the nonlinear optical fiber by a magnitude of at least 0.5 dB but less than 10 dB. By using such a fiber, it is possible to provide moderate loss for the pump pulse travelling along the fiber. The less than one order of magnitude change of the pump pulse shifts the signal frequency predominantly by one uni-directional amount, and the >0.5 dB intensity change makes the difference between the maximum and minimum XPM phase shift applied by the pump pulse on the signal at least 10% of the maximum XPM phase shift itself, thus allowing the pump power to be effectively deployed for the desired purpose of generating a time-varying phase shift.

In one embodiment of the first aspect, the pump pulse is depolarized such that the phase shift on the optical signal is polarization-independent. Polarization independent operation may be useful in some applications.

In one embodiment of the first aspect, the pump pulse has a wavelength $\lambda_p$, and the nonlinear optical medium has a dispersion such that the walk-off between the pump pulse and the optical signal is a function of $\lambda_p$ such that $t_w(\lambda_p)$ is changeable by tuning $\lambda_p$, wherein $\lambda_p$ is tuned so that the repetition rate $R_p=(1\pm0.1)/L \cdot t_w(\lambda_p)$ of the pump pulse is also tuned. In this case, a dispersion in the nonlinear optical medium will change $t_w$ and thus the nominal value of the repetition rate $R_p$, thereby changing the value of the frequency shift applied by the apparatus.

In one embodiment of the first aspect, the pump pulse has a wavelength $\lambda_p$ changeable between a first value $\lambda_{p,1}$ and a second value $\lambda_{p,2}$, and the nonlinear optical medium has a dispersion such that the walk-off between the pump pulse and the optical signal is a function of $\lambda_p$ such that $t_w(\lambda_p)$ is changeable by tuning $\lambda_p$. At the first value $\lambda_{p,1}$, the walk-off $t_w$ between the pump pulse and the optical signal is a positive number, while at the second value $\lambda_{p,2}$ the walk-off $t_w$ between the pump and signal is a negative number. In this case, the dispersion in the nonlinear optical medium will remain the magnitude $t_w$ nearly unchanged or fixed but at the same time the sign of $t_w$ will depend on the wavelength of the pump pulse. Thus, by selecting the wavelength of the pump pulse, it is possible to control the sign of the phase shift.

In one embodiment of the first aspect, a difference between a maximum phase shift $\phi_{max}$ on the optical signal and a minimum phase shift $\phi_{min}$ on the optical signal is $\phi_{max} - \phi_{min} = i \cdot 2\pi$, thus causing a serrodyne frequency shift where >75% of the frequency of the optical signal passed through the signal filter is shifted relative to the frequency of the optical signal at the first input port by a fixed amount of magnitude $|i \cdot R_p|$.

In one embodiment of the first aspect, the nonlinear optical fiber is configured to have a propagation loss leading to a change in the intensity of the pump pulse. By using such a fiber, it is possible to provide a desired phase shift In one embodiment of the first aspect, the nonlinear optical fiber is configured to provide a gain in the intensity of the pump pulse. The gain may allow the pump pulse to experience an exponential increase in its intensity during its propagation along the nonlinear optical medium and, consequently, lead to generating a desired temporally varying phase shift on the optical signal.

In one embodiment of the first aspect, the apparatus further comprises a Raman pump coupled to the nonlinear optical medium and configured to induce at least partly the gain in the intensity of the pump pulse in the nonlinear optical medium. By using the Raman pump, it is possible to efficiently induce the gain in the intensity of the pump pulse.

In one embodiment of the first aspect, the propagation loss of a wavelength of the pump pulse is larger than the propagation loss of a wavelength of the optical signal. This may provide the specified loss at the wavelength of the pump pulse without causing a large loss at the wavelength of the optical signal.

In one embodiment of the first aspect, the Raman pump is configured to provide an increasing or decreasing pump intensity when the combined signal passes through the nonlinear optical medium. By so doing, it is possible to control the sign of the phase shift.

According to a second aspect, an apparatus for shifting a frequency of an optical signal is provided. The apparatus comprises a first input port configured to receive the optical signal and a second input port configured to receive a pump pulse. The apparatus further comprises a WDM coupled to the first input port and a second input port. The WDM is configured to generate a combined signal by combining the optical signal and the pump pulse. The apparatus further comprises a nonlinear optical medium configured to pass the combined signal therethrough.

The nonlinear optical medium has a length L. The apparatus further comprises a signal filter configured to receive the combined signal passed through the nonlinear optical medium and remove the pump pulse from the combined signal but pass the optical signal from the combined signal. The pump pulse travels along the nonlinear optical medium at a group velocity that is mismatched with respect to the input optical signal such that the pump pulse and the optical signal walk-off by a time of $C \cdot L \cdot t_w$, where $t_w$ is a group velocity mismatch between the pump pulse and the optical signal per unit length, and C is $0.5 \pm 0.1$. The pump has a repetition rate $R_p = (1 \pm 0.2)/(L \cdot t_w)$. XPM resulted from the pump pulse causes a time-varying phase shift on the optical signal such that a nearly temporally symmetric phase shift is induced in the optical signal, thereby causing a nearly symmetric change in a signal spectrum shifting a portion of an optical power by $\pm i \cdot R_p$ where i is an integer. By using the apparatus according to the second aspect, it is possible to generate new spectral frequencies from the optical signal. A common use would be to shift a frequency of a laser signal for making a coherent optical measurement. The apparatus according to the second aspect may be used in various fields involved with sensing optical signals, such as optical spectroscopy, laser vibrometry, and fiber-optic sensing systems.

In one embodiment of the second aspect, the pump pulse is depolarized such that the phase shift on the optical signal is polarization-independent. Polarization independent operation may be useful in some applications.

In one embodiment of the second aspect, the pump pulse is a short pulse having a pulse-width $\tau_p < 0.1 \cdot L \cdot t_w$, and the nonlinear optical medium is configured such that the pump pulse experiences an amount of loss less than 1 dB when the pump pulse passes through the nonlinear optical medium. In this embodiment, the phase shift induced by the XPM may mimic a symmetric square wave.

In one embodiment of the second aspect, the pump pulse is a 50% duty cycle square wave resulting in a triangular ramp phase modulation on the optical signal. Such a pump pulse may be used with C=0.5 to create a triangular up/down signal phase ramp.

In one embodiment of the second aspect, the pump pulse is a pulse having a full-width-at-half maximum between 25-40% of $L \cdot t_w$ causing a sinusoid-like temporal phase shift to be imparted on the optical signal.

In one embodiment of the second aspect, the pump pulse has a pump energy set to cause approximately a $\pi$ phase shift difference between a maximum phase shift and a minimum phase shift of the optical signal. By using such a pump pulse, it is possible to strongly suppress the original carrier frequency of the optical signal.

According to a third aspect, a method for shifting a frequency of an optical signal is provided. The method starts with the steps of receiving the optical signal and a pump pulse. Then, the method proceeds to the step of generating a combined signal by combining the optical signal and the pump pulse. Further, the method goes on to the step of propagating the combined signal through a nonlinear optical medium. After that, the method proceeds to the step of removing the pump pulse from the combined signal passed through the nonlinear optical medium, thereby isolating the optical signal from the combined signal. The pump pulse and the optical signal walk-off each other temporally in the nonlinear optical medium by a time T. The pump pulse has a repetition frequency set to 1/T. The pump pulse has a pump energy varying along the nonlinear optical medium such that an intensity of the pump pulse changes by more than 0.5 dB but less than 10 dB. The pump energy is of a magnitude that maximum and minimum cross-phase modulation (XPM) induced by the pump pulse on the optical signal differs by and an integer multiple of $2\pi$. By so doing, it is possible to generate new spectral frequencies from the optical signal. A common use would be to shift a frequency of a laser signal for making a coherent optical measurement. The method according to the third aspect may be used in various fields involved with sensing optical signals, such as optical spectroscopy, laser vibrometry, and fiber-optic sensing systems.

In one embodiment of the third aspect, the method further comprises the step of providing a gain in the intensity of the pump pulse in the nonlinear optical medium by using a Raman pump. By using the Raman pump, it is possible to efficiently induce the gain in the intensity of the pump pulse. The gain itself may may allow the pump pulse to experience an exponential increase in its intensity during its propagation along the nonlinear optical medium and, consequently, lead to generating a desired temporally varying phase shift on the optical signal.

In one embodiment of the third aspect, each of the pump pulse and the optical signal has a wavelength, and the wavelength of the pump pulse is set to have a loss in dB/km in the nonlinear optical medium that is more than twice as high as a loss of the wavelength of the optical signal in the nonlinear optical medium. This may allow the wavelength of the pump pulse to experience a desired loss level, while maintaining much lower loss at the wavelength of the optical signal.

Other features and advantages of the present disclosure will be apparent upon reading the following detailed description and reviewing the accompanying drawings.

BRIEF DESCRIPTION OF DRAWINGS

The present disclosure is explained below with reference to the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments. In general, features described in one embodiment might be suitable for use in other embodiments, as would be apparent to those skilled in the art.

The word "exemplary" is used herein in the meaning of "used as an illustration". Unless otherwise stated, any embodiment described herein as "exemplary" should not be construed as preferable or having an advantage over other embodiments.

The embodiments disclosed herein relate to apparatuses and method for shifting a frequency of an optical signal in a low-loss manner. In the apparatuses and method, a time-dependent phase shift is imposed on the optical signal via a pump pulse. In general, the phase shift does not follow the time dependence of the pump pulse, but also depends on a temporal walk-off in a nonlinear optical medium (e.g., a non-linear optical fiber) between the pump pulse and the input signal, i.e., $t_w \cdot L$, where $t_w$ is the pump-to-signal walk-off per unit length of the nonlinear optical medium, and L is the total length of the nonlinear optical medium, as well as on the loss-profile of the wavelength of the pump pulse which is commonly an exponential profile. The pump pulse has a pump energy $E_{pump}$ varying with length along the nonlinear optical medium as $E_{pump}(L)=E_0 \cdot e^{aL}$, where in a passive (lossy) medium a is negative and in an active (gain) medium a is positive. The pump pulse has a repetition rate $R_p=C/t_w \cdot L$, where C is the fractional walk-off of the pump pulse with respect to the optical signal over the length of the nonlinear optical medium which is set to be some desired level, commonly 50% or 100%. The pump pulse may be depolarized such that the phase shift imposed on the optical signal does not depend on the polarization of the optical signal.

In one embodiment, the pump may be a short pulse that experiences moderate loss of >0.5 dB but <10 dB during its propagation through the nonlinear optical medium ($0.12 < |\alpha|L < 2.3$). One benefit of the short pump pulse is that a wider spectral bandwidth associated with the short pump pulse inhibits stimulated Brillouin scattering allowing higher average optical powers to be injected into the nonlinear optical medium, such as a nonlinear optical fiber. The level of energy of the pump pulse along the nonlinear optical fiber may roughly be approximated by a linear function, especially for losses that are in the lower end of the specified range. The applied XPM-induced phase shift on the optical signal is thus also quasi-linear. The fractional pump walk-off is set to C=1 and the pump pulse-width ($t_p$) is much narrower than the pump period, for instance $<0.2/t_w \cdot L$. The difference between the maximum and minimum phase shift induced on the optical signal by the pump pulse differs by $i \cdot 2\pi$ radians, where i is the integer. In this way, the optical signal is shifted by a fixed frequency of magnitude $|i \cdot R_p|$, where the efficiency of the phase shift is very high (>90%) when the net change in the intensity of the pump pulse through the nonlinear optical medium is low (<6 dB), since in this case the applied phase shift is closer to a linear ramp. However, the less the pump energy changes during propagation in the nonlinear optical medium, the more pump power is required to achieve the desired 2π phase shift between the maximum and the minimum XPM signal phase shift. This makes cases where there are small amounts of the pump energy change over the nonlinear optical fiber very pump-power inefficient, thus the desired specification for >0.5 dB of the pump energy change over the fiber. The pump pulse may be depolarized to produce a polarization-independent effect for the phase shift of the optical signal.

In one embodiment, the wavelength of the pump pulse may be selected to be in a different band than the wavelength of the optical signal, for instance, near 1064 nm or 1950 nm for a 1550 nm optical signal. In this way, the pump pulse may have a larger passive loss per unit length than the optical signal, allowing the pump pulse to experience a desired amount of propagation loss while the optical signal experiences much lower loss. Widely spacing the pump/signal wavelengths may also help reduce the loss of pump/signal wavelength division multiplexing, further helping to keep overall signal losses low.

In another embodiment, the pump pulse and the optical signal are separated in wavelength by a smaller amount, such as in the range of 1 to 80 nm. Without loss of generality, the pump pulse and the optical signal may be placed in the telecommunications "C-band" of operation, i.e., 1525-1565 nm, allowing access to a wide variety of commercial components including fiber amplifiers. In such a system, the pump pulse and the optical signal have similar loss profiles, so as the loss of the pump pulse is increased to make more efficient use of the pump power the loss of the optical signal is also increased. This tradeoff may be avoided by adding a Raman pump to generate a gain at either the pump pulse or the optical signal or both wavelengths, although other gain types, such as parametric gain or Brillouin gain, may also be used. The gain allows the pump pulse to experience an exponential increase in intensity during propagation along the nonlinear optical medium which generates a desired temporally varying phase shift on the optical signal.

In one embodiment, it is possible to tune the phase shift by changing the repetition rate of the pump pulse around the nominal $R_p$ level. As the frequency of the pump pulse is shifted further from $(t_w \cdot L)^{-1}$, the amount of output signal power that is in a desired spectral frequency (having been shifted by a designed amount of $R_p$) will be degraded. Keeping $R_p$ within 10% of the nominal value minimizes this effect.

The same physical embodiment may also generate near symmetric side-bands about the carrier frequency of the optical signal by changing the energy of the pump pulse so that the phase shift between the maximum and minimum phase shift on the optical signal is small, for instance <1 radian.

In one embodiment, it is possible to tune the wavelength of the pump pulse to change the magnitude or sign of the walk-off parameter. If, due to a dispersion in the nonlinear optical medium, the net walk-off between the pump pulse and the optical signal, i.e., $t_w \cdot L$, becomes wavelength-dependent, then tuning the pump or signal wavelength may change the nominal frequency shift of $|R_p|$. For instance, if the pump pulse has a group delay equal to $t_{p,o}+\Delta \cdot \delta\lambda$, where D is the dispersion in ps/nm·km and $\delta\lambda$ is the change in the pump wavelength from the central value of $\lambda_{p,o}$, and $\delta\lambda = (\lambda_{p,o}-\lambda_p)$, then changing the pump wavelength also changes $t_w$ and thus the nominal value of $R_p$. This may be used to tune the frequency shift applied to the optical signal over an extended range.

For example, if a pump wavelength $\lambda_p$ and a signal wavelength $\lambda_s$ are chosen to be on opposite sides of a fiber zero dispersion wavelength such that the pump pulse and the optical signal have nearly identical propagation speeds ($t_w \sim 0$), then if the pump wavelength of $\lambda_p+\delta\lambda$ or a pump wavelength $\lambda_p+\delta\lambda$ is used, they will each have a non-zero walk-off with respect to the signal wavelength of nearly identical magnitude of $|t_w|$, but of opposite sign. This means that the sign of the signal frequency shift may be changed by changing the pump wavelength.

In another embodiment, the fractional pump walk-off is set to C=0.5, the nonlinear optical medium is a nonlinear optical fiber, and the pump and signal wavelength are chosen for small pump insertion loss, for instance <1 dB. The XPM-induced phase shift that the pump pulse imparts to the optical signal is near π radians. In this case, the applied phase shift is nearly a 50% square wave and the power in the original carrier frequency of the optical signal is suppressed. Two nearly symmetric first-order tones at repetition rates $\pm R_p$ will contain most of the optical power. If instead the pump power is reduced so that the applied phase shift is <1 radian, then the carrier power dominates although two small symmetric tones are still efficiently generated.

In one embodiment, the closely-spaced pump and signal design may work well for shorter fibers that have low loss for both the pump and signal wavelengths when a near-constant phase shift is desired, such as when implementing a carrier-suppression square-wave phase shift with C=0.5, or when C=1 but the pump pulse having a pulse-width of $(0.25-0.4) \cdot t_w \cdot L$ is used to roughly emulate a sinusoidal phase shift, for instance, to generate two small symmetric first order sidebands. In another embodiment, a 50% duty cycle square wave pump may be used with C=0.5 to create a triangular up/down signal phase ramp. For these embodiments, the pump loss is engineered to be small so the apparatuses and method may be low loss for both the pump and signal wavelengths and the applied phase shift is nearly temporally symmetric, thereby leading to spectrally symmetric frequency shifts.

Figure 1:
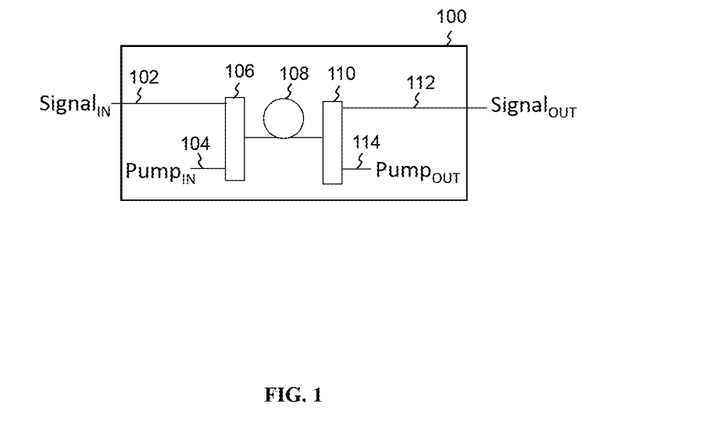
FIG. 1 shows a schematic block diagram of an apparatus for shifting a frequency of an optical signal in accordance with one exemplary embodiment.

FIG. 1 shows a schematic block diagram of an apparatus 100 for shifting a frequency of an optical signal in accordance with one exemplary embodiment. The apparatus 100 may be also referred to as an optical frequency shifter. As shown in FIG. 1, the apparatus 100 comprises a first input port 102 for the optical signal having a wavelength $\lambda_s$ and a second input port 104 for an pump pulse having a wavelength $\lambda_p$. Each of the first and second input ports 102 and 104 may be implemented as a fiber port. The apparatus 100 further comprises a first (input) wavelength division multiplexer (WDM) 106 configured to generate a combined signal by combining the pump pulse and the optical signal. The apparatus 100 further comprises a nonlinear optical medium which may represented by a nonlinear optical fiber 108 coupled to the output of the input WDM 106. The combined signal are sent through the nonlinear optical fiber 108 to a signal filter also comprised in the apparatus 100. Due to the interaction of the pump pulse and the optical signal in the nonlinear optical fiber 108, an XPM-induced phase shift on the optical signal is provided. In the embodiment shown in FIG. 1, the signal filter is assumed to be implemented as a second (output) WDM 110, but those skilled in the art would recognize that any other filter configuration allowing one to isolate the desired optical signal from the combined signal by removing or blocking the pump pulse in the combined signal may be used. It is assumed that the output WDM 110 is configured to remove the pump pulse from the combined signal but pass the optical signal from the combined signal therethrough. The isolated (output) optical signal is outputted via a first output port 112, while the removed or blocked (output) pump pulse is outputted via a second output port 114. Again, each of the first and second output ports 112 and 114 may be implemented as a fiber port. The output optical signal exiting the apparatus 100 has a time-dependent phase shift compared to the input optical signal, and the time-dependent phase shift depends on the properties of the pump pulse and the nonlinear optical fiber 108.

The nonlinear optical fiber 108 of length L may be characterized by a walk-off parameter $t_w$, which is a pump-to-signal temporal walk-off per unit fiber length, and by net transmissivities $T_p$ and $T_s$ at $\lambda_p$ and $\lambda_s$, respectively. For this passive design, where the pump pulse has an energy changing during its propagation through the nonlinear optical fiber 108 due to exponential passive fiber loss, $T_p$ and $T_s$ are both less than unity. Ideally $T_s$ is as close to unity as possible (to achieve the smallest possible signal loss, where loss=(1−T)), while $T_p$ is selected to fall within the range from 0.9 (0.5 dB loss) to 0.125 (9 dB loss). As a non-restrictive numerical example, if $T_p$=0.5, or equivalently 3 dB of pump propagation loss, and if the wavelength of the pump pulse is near 1064 nm, the fiber loss may be ~1 dB/km, leading to a 3 km fiber length. If the wavelength of the optical signal is near 1550 nm, the fiber loss may be <0.2 dB/km, leading to <0.6 dB loss through the nonlinear optical fiber 108. Note that the pump pulse has considerably more loss than the optical signal, more than twice as much loss in units of dB/km, which helps to keep the pump loss within a desired range without causing too much signal loss. With these widely separated wavelengths, the insertion loss caused by the WDMs 106 and 110 at the wavelength of the optical signal may also be very small, for instance, just 0.1 dB, allowing the net signal loss through the entire apparatus 100 to be very small (<1 dB), while still allowing the desired 3 dB of pump loss.

The net pump-to-signal temporal walk-off over the length L of the nonlinear optical fiber 108 is $C \cdot t_w \cdot L$, where C is the constant that is equal to unity in this embodiment, and the pump pulse has a repetition rate $R_p$ nominally set to $1/(t_w \cdot L)$. As a non-restrictive numerical example, if $|t_w|$=1.33 ns/km, then $R_p$=400 MHz for a 3 km fiber. The energy of the pump pulse is set so that a maximum time-varying phase shift $\phi_{max}$ induced by the pump pulse on the optical signal and a minimum phase shift min on the optical signal is $\phi_{max}-\phi_{min}=i \cdot 2\pi$, where i is the integer. The pump pulse has a width $\tau_p$ that is a near impulse function, where $\tau_p<0.2/(t_w \cdot L)$, and ideally even shorter (e.g., 1% of a pump period of $t_w \cdot L$) so as to enable the capability to generate very temporally fast changes in phase that will emulate a ramp function. Since the pump pulse is 2× stronger in energy at the start of the nonlinear optical fiber 108 than at the end of the nonlinear optical fiber 108, over which time the pump pulse and the optical signal walk-off by exactly one pump period or a time of $1/R_p$, $\phi_{max}=2 \cdot \phi_{min}$. One may assume without loss of generality that i=1, which will cause a frequency shift of the frequency of the optical signal from $f_o$ to either $f_o+R_p$ or $f_o-R_p$, depending on if the pump pulse travels faster or slower than the optical signal (which is also related to the sign of $t_w$). The frequency shift is multiplied by a factor of "i" if a different integer i is used.

Figure 2:
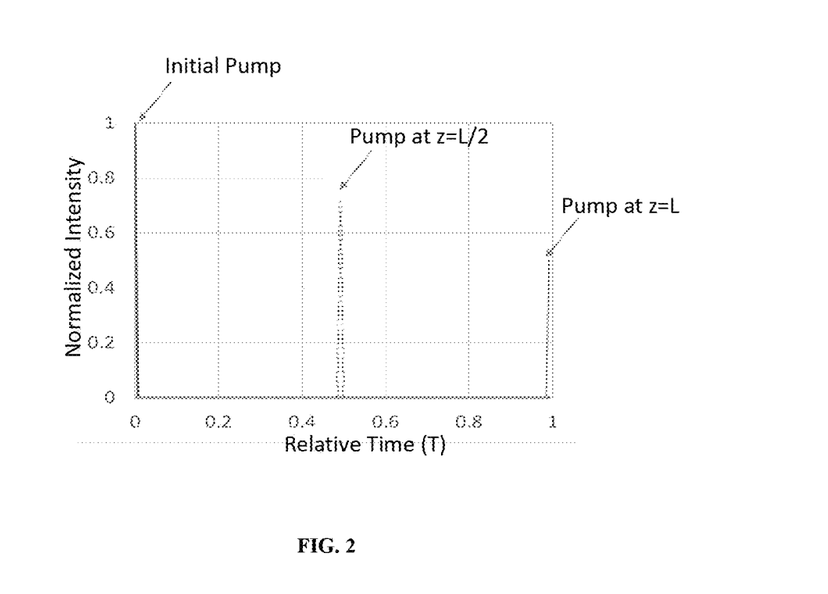
FIG. 2 shows a normalized intensity of a pump as a function of relative time T at different propagation distances z in a nonlinear optical medium of length L, namely: T=0 corresponds to the start of the nonlinear optical medium (z=0), and T=1 corresponds to the end of the nonlinear optical medium (z=L). 3 dB of total loss is experienced by the pump through the nonlinear medium.

FIG. 2 shows a normalized intensity of the pump pulse as a function of relative time T at different propagation distances z in the nonlinear optical medium. As noted above, the nonlinear optical medium may be represented by the nonlinear optical fiber 108. The relative time is zero at the start of the nonlinear optical fiber 108 and unity at the end of the nonlinear optical fiber 108, so that the relative time T=1 translates to a time shift of $t_w \cdot L$ between the pump pulse and the optical signal. Initially the pump pulse is at full power (at the relative time T=0 or the start of the nonlinear optical fiber 108). After propagating through L/2 of the nonlinear optical fiber 108, the pump pulse is attenuated by 1.5 dB (which corresponds to the relative time T=0.5), and at this point it has moved $0.5 \cdot t_w \cdot L$ with respect to the optical signal. At the end of the nonlinear optical fiber 108, the pump pulse is attenuated by 3 dB and is shifted by the relative time of $t_w \cdot L$ with respect to the optical signal. The energy, and thus intensity, of the pump pulse thus changes over the fiber length.

Figure 3:
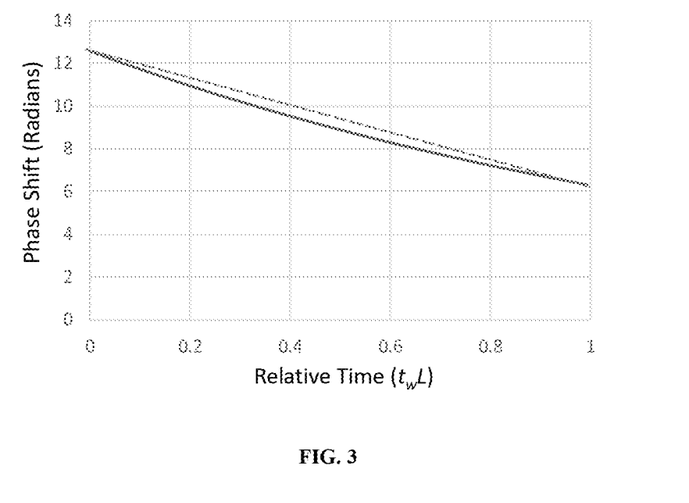
FIG. 3 shows a resulting XPM-induced phase shift on the optical signal, with the solid line corresponding to the exponential loss of the pump pulse and the dotted line corresponding to a linear phase change.

FIG. 3 shows a resulting XPM-induced phase shift on the optical signal. More specifically, in FIG. 3, the solid line corresponds to the simulated phase shift based on the exponential loss of the pump pulse, while the dashed line corresponds to an ideal linear phase shift. For a 3 dB loss, the phase shift is reasonably approximated as linear, but the approximation becomes better for lower amounts of loss. The power of the pump pulse has been chosen so that the maximum phase shift is $4\pi$ and the minimum phase shift is $2\pi$ radians, leading to a $2\pi$ phase shift across the time of $t_w \cdot L$. The simulations show that 97% of the output power (i.e., power at the output of the apparatus 100) of the optical signal is shifted by an amount $R_p$ under these conditions, closely approximating a serrodyne frequency shift.

If the pump pulse has a repetition rate changing from the nominal value of $1/(t_w \cdot L)$ to an adjusted value, then the frequency shift may also be tuned. However, as the repetition rate is moved away from the nominal value, the efficiency with which all the power of the optical signal at the output of the apparatus 100 is shifted unidirectionally to a single output frequency is reduced. If the repetition rate is within 10% of the nominal value, the efficiency is still high, thereby allowing the frequency shift to be tuned over a range of values.

The nonlinear optical fiber 108 is ideally constructed of a fiber that can be spliced with low loss to an output fiber of the WDM 106 so that there is low overall loss for the signal wavelength. For instance, it is assumed that the fiber is made from a common standard single-mode fiber, such as Corning SMF-28e fiber. Such fiber has also very low propagation losses, including <0.2 dB/km near a wavelength of 1550 nm.

In order to achieve >50% of the output power of the optical signal shifted into a particular tone, for instance shifted from the frequency $f_o$ of the optical signal at the input of the apparatus 100 to the frequency of $f_o+R_p$, a temporally asymmetric phase shift should be applied, ideally a linear phase ramp with an instantaneous transition from one phase-shift extrema to another. Such a shift may lead to >90% of the output power of the optical signal being shifted to a desired tone if an exponential change in the power of the pump pulse is <6 dB along the length of the nonlinear optical medium (e.g., the nonlinear optical fiber 108). For a change in the power of the pump pulse 3 dB and a short pump pulse of full width at a half maximum of 0.01·T, about 97% of the optical signal at the output of the apparatus 100 will be shifted to a desired frequency. Smaller changes in the energy of the pump pulse propagating through the nonlinear optical medium lead to a more nearly linear phase shift, thereby more effectively shifting the output power of the optical signal to a single frequency. However, the smaller the change in the intensity of the pump pulse over the nonlinear optical fiber 108, the more energy of the pump pulse is required per pulse in order to achieve the desired $i \cdot 2\pi$ difference between the maximum and minimum XPM-induced phase shift of the signal's quasi-linear phase ramp. This trade-off creates a reasonable range of operation where the intensity of the pump pulse changes by at least 0.5 dB but less than 10 dB over the nonlinear optical fiber 108.

The pump pulse is a short pulse, both to allow for a fast transition between the minimum and maximum XPM-induced phase shift and in some cases to inhibit Brillouin scattering in the nonlinear optical fiber 108 that might otherwise limit the maximum launchable power of the pump pulse.

Figure 4:
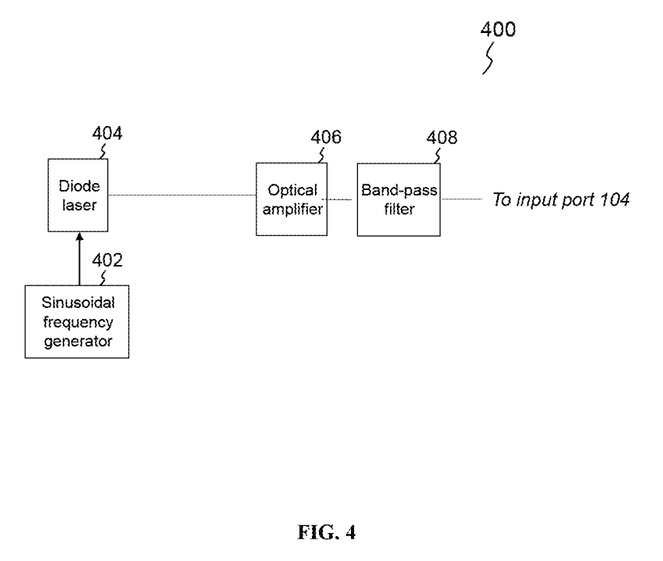
FIG. 4 shows a schematic block diagram of an apparatus for generating pump pulses using a gain switched laser diode.

FIG. 4 shows a schematic block diagram of an apparatus 400 for generating pump pulses using a gain switched laser diode. The apparatus 400 may be coupled to the second input port 104 of the apparatus 100. As shown in FIG. 4, the apparatus 400 comprises a sinusoidal frequency generator 402 configured to create a sinusoidal electrical drive signal and provide it to a diode laser 404, thereby generating gain-switched pulses at a sinusoidal frequency. The apparatus 400 further comprises an optical amplifier 406 and a band-pass filter 408 which are used to create pulses of both strong energy and short pulse duration. This configuration of the apparatus 400 allows the repetition rate of the pump pulse to be easily changed by changing the frequency of the sinusoidal frequency generator 402 and may generate very short pump pulses of <50 ps for a broad range of repetition rates. The repetition rate of the pump pulse may typically be changed by 10% without having a major impact on the frequency-shifting quality, meaning that the output frequency shift may be tuned directly over this range. A higher range, for instance ±20%, will also work but with a higher fraction of the output optical signal being shifted to undesired frequencies. To generate pump pulses, the apparatus 400 only needs an electrical sinusoidal signal, but other pump generation schemes, like the one using a mode-locked laser, may not require any electrical drive signals at all. Importantly, a difficult-to-generate high fidelity electrical ramp signal is not required.

Another useful pump wavelength choice to use is a longer wavelength, such as 1950 nm. Such a long pump wavelength has very strong loss in a standard fiber, for instance 10 dB/km, meaning that a short fiber of <300 meters will have enough pump loss to generate a desired phase shift. This allows the optical signal to have almost no loss (<0.1 dB) in the nonlinear optical fiber 108, highlighting the ability of this scheme to have very low net signal loss. It also has very low Raman noise generated in the nonlinear optical fiber 108, making it suitable for small quantum noise limited signals including those of <1 photon per measurement window.

Figure 5:
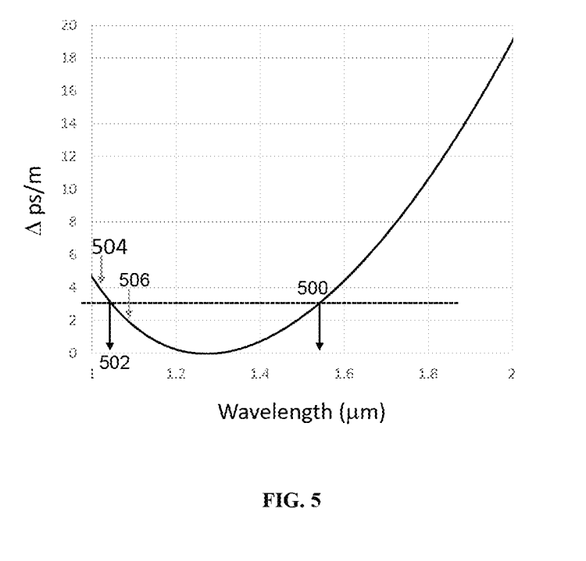
FIG. 5 shows a pulse delay ($\Delta$ in ps/m) in silica with respect to a zero-dispersion wavelength as a function of a wavelength.

FIG. 5 shows a pulse delay ($\Delta$ in ps/m) in silica with respect to a zero-dispersion wavelength as a function of a wavelength. In other words, FIG. 5 shows a typical dispersion map for silica, where a relative group delay with respect to the zero-dispersion wavelength is plotted as a function of wavelength. The arrow labeled 500 points to an assumed signal wavelength (at the input of the apparatus 100), and the arrow 502 points to a pump wavelength that propagates with the same speed as the optical signal making $t_w=0$. The arrows 506 and 504 point to pump wavelengths that have the same magnitude of the group velocity or $|t_w|$ with respect to the signal wavelength but opposite signs. Thus, if the pump wavelength is tuned to the wavelength of either the arrow 504 or 506, then they both will have the same magnitude but a different sign of $t_w$. Thus, shifting the pump wavelength between these two points will shift the direction of the frequency shift (e.g., either $+R_p$ or $-R_p$) without requiring any other system changes. This property may be used to make an optical frequency shifter that allows direct control of the sign of the frequency shift. In general, any time the relative delay between the pump pulse and the optical signal is sensitive to the pump wavelength, then the nominal value of $R_p$ may be tuned by changing the pump wavelength, thus allowing the nominal frequency shift to be tuned over a wider range of operation.

Figure 6:
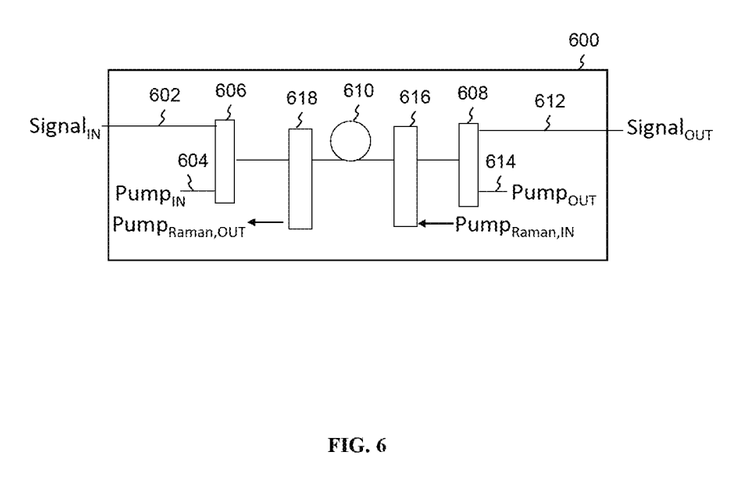
FIG. 6 shows a schematic block diagram of an apparatus for shifting a frequency of an optical signal in accordance with another exemplary embodiment, in which a backward propagating Raman pump is used to change an energy of a pump pulse along the length of a nonlinear optical medium.

FIG. 6 shows a schematic block diagram of an apparatus 600 for shifting a frequency of an optical signal in accordance with another exemplary embodiment. Similar to the apparatus 100, the apparatus 600 may be also referred to as an optical frequency shifter. As shown in FIG. 6, the apparatus 600 comprises a first input port 602 for the optical signal and a second input port 604 for a pump pulse. The apparatus 600 further comprises a first (input) WDM 606 and a second (output) WDM 608 which are interconnected via a nonlinear optical medium (e.g., a nonlinear optical fiber 610) and similar in functionalities to the first and second WDMs 106 and 110, respectively. In other words, the input WDM 606 is configured to generate a combined signal by combining the pump pulse and the optical signal, while the output WDM 608 is configured to remove the pump pulse from the combined signal passed through the nonlinear optical fiber 610 but pass the optical signal from the combined signal. The passed or isolated (output) optical signal and the removed or blocked (output) pump are then outputted via first and second output ports 612 and 614, respectively. It should be again noted that the second WDM 608 may be represented by any other signal filter, if required and depending on particular applications.

In this embodiment, the wavelengths of the pump pulse and the optical signal may be similar, such as both in the lowest-loss 1550 nm band for fiber propagation. Since both wavelengths are similar, they both have similar propagation losses, and it is difficult to have large pump loss of, say, 3 dB without also having large signal loss. This problem is circumvented in this embodiment by adding a controlled gain to the nonlinear optical fiber 610. More specifically, the apparatus 600 further comprises a Raman input wavelength-division multiplexer (WDM) 616 that allows a backward propagating Raman pump to be injected into the nonlinear optical fiber 610. The Raman pump has a frequency about 12 THz higher than the pump pulse so that the pump pulse experiences a Raman gain in a typical fiber. The apparatus 600 further comprises a Raman output WDM 618 that allows the Raman pump to be removed after propagating through the nonlinear optical fiber 610. The Raman pump creates the gain in the nonlinear optical fiber 610, in this case at both the pump and signal wavelengths although depending on the wavelength plan it could be a preferential gain at just the pump wavelength. The gain at the pump wavelength changes the energy of the pump pulse along the nonlinear optical fiber 610, which in turn changes the XPM-induced phase shift. The gain typically follows an exponential or near-exponential profile, which corresponds to a near-linear profile for small gains (e.g., <3 dB) exactly analogous to the passive (pure loss) case previously described. The power of the Raman pump may be modified to control the difference between the maximum and minimum applied XPM-induced phase shift on the input optical signal.

Figure 7A:
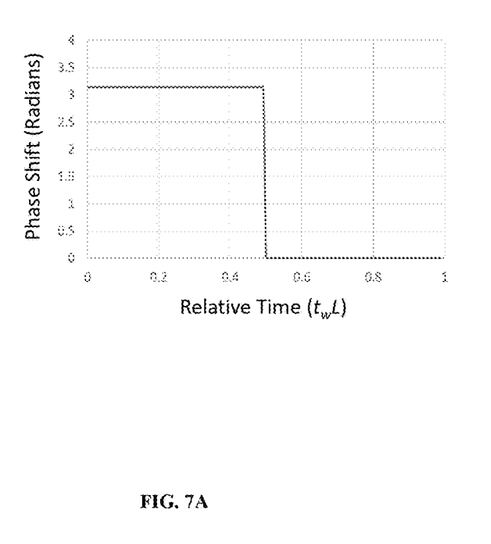
FIGS. 7A and 7B show (Left) an applied XPM-induced phase shift (see FIG. 7A) and a resulting simulated optical spectrum (see FIG. 7B) for carrier suppressed side-band generation, where the pump pulse walks-off the optical signal by 50% of a pump period (C=0.5)
Figure 7B:
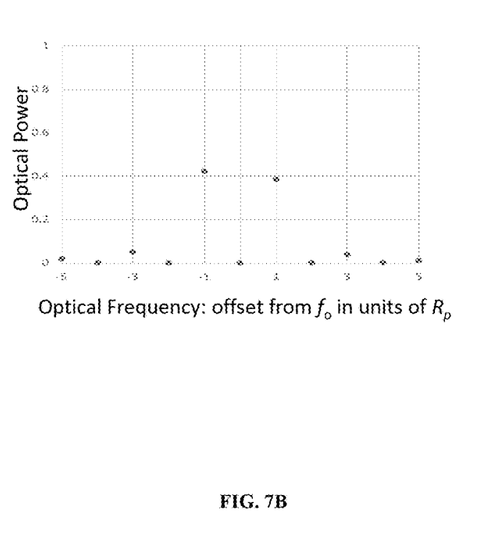

By using the apparatus 100, but now setting C=0.5 and the total pump loss through the nonlinear optical fiber 108 to <1 dB, one can create a nearly square-like XPM-induced phase shift on the optical signal. FIG. 7A shows a simulation of a nearly perfect square phase shift with a π phase difference between the maximum and minimum phase shifts, and FIG. 7B shows a resulting simulated optical spectrum. The spectrum shows that the original carrier frequency is highly suppressed and shifted primarily to the first-order sidebands. Note that due to the limited resolution of the simulation, the two first-order sidebands do not have exactly equal power but are similar in power and would be equal in the ideal case.

Figure 8A:
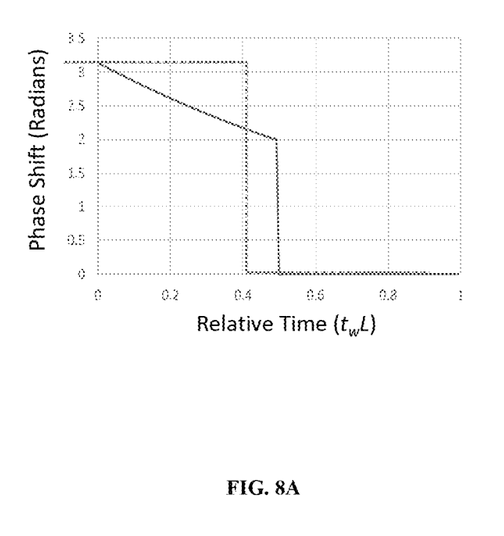
FIGS. 8A and 8B show an applied XPM-induced phase shift as a function of relative time (see FIG. 8A), where the solid line corresponds to an actual phase shift and the dotted line corresponds to a desired perfectly square phase shift, and a resulting optical spectrum (see FIG. 8B) for near carrier suppressed side-band generation when the pump experiences 2 dB of loss. The spectrum is no longer nearly symmetric, and the carrier suppression has less extinction.
Figure 8B:
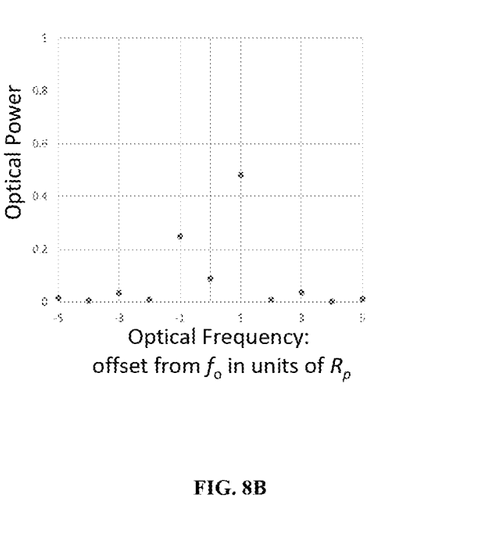

FIGS. 8A and 8B show the applied XPM-induced phase shift (see FIG. 8A) as a function of relative time, and a resulting optical spectrum (see FIG. 8B) for near carrier suppressed side-band generation when the pump pulse experiences 2 dB of loss. The loss causes a near-linear slope in the square wave (see the solid line in FIG. 8A) in comparison to the ideal flat square wave (see the dashed line in FIG. 8A). The resulting phase shift and optical spectrum are now clearly asymmetrical. This shows that in order to preserve a near-symmetrical spectrum, the pump loss in the nonlinear optical fiber 108 should be smaller, for instance <1 dB. One way to accomplish this is to keep the nonlinear optical fiber 108 short enough so that the passive loss is <1 dB. In such a situation, the pump and signal may be in the same low-loss waveband and both the pump and signal wavelengths may simultaneously have low loss. It is also possible to use a longer fiber length with larger passive loss, but add the Raman gain and adjust the power of the Raman pump to achieve small net gains of ~1 dB.

Figure 9:
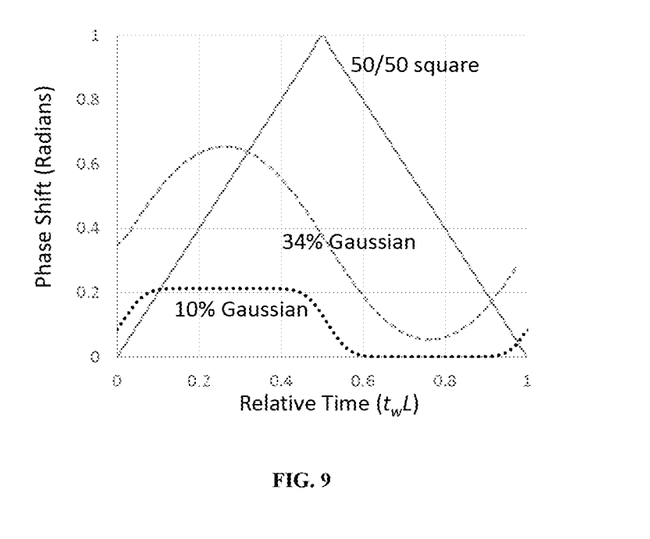
FIG. 9 shows a temporal phase shift incurred for a C=0.5 walk-off when the pump pulse is a Gaussian of FWHM of 10% of the pump period (see the square-like dotted line), a Gaussian of FWHM of 34% of the pump period (see the sine-like dashed line), and for a 50/50 square pump profile (see the triangular solid line).

FIG. 9 shows the pump intensity averaged over a time of $0.5 \cdot t_w \cdot L$, which is the pump-to-signal walk-off when C=0.5 so it represents the shape of the XPM-induced phase shift provided by the apparatus 100. The integrated pump intensity shows the shape of the phase-shift induced by the pump. Pump pulses of a Gaussian shaped with full width at half maximum (FWHM) of $0.1 \cdot t_w \cdot L$ (see the dotted line) or $0.34 \cdot t_w \cdot L$ (see the dashed line), and pump of a 50% square wave (see the solid line) are plotted. The pump loss is assumed negligible in these plots. These shapes correspond to the expected shape of the phase-shift of the signal as a function of time. As expected, the $0.1 \cdot t_w \cdot L$ case creates a near square-like shape, but the Gaussian of FWHM=$0.34 \cdot t_w \cdot L$ creates a nearly sinusoidal phase shift profile. For pump pulse widths between $0.25 \cdot t_w \cdot L$ and $0.4 \cdot t_w \cdot L$, a sinusoidal-like phase shift may be generated, which may be desired by some users to mimic a typical sinusoidal phase shifter. The 50% (50/50) duty cycle square wave also leads to a special case where the applied phase shift is a triangular phase shift with an equal up and down ramp. These special cases of temporally symmetric phase shifts are useful modes of operation when symmetric spectra are desired, such as when mimicking sinusoidal phase modulation. Note that in all these cases the pump profile is simple to generate in practice.

Similar to prior embodiments, the value of the pump repetition rate may be tuned from the nominal value where C=0.5, but to preserve the symmetric phase shift the amount it is tuned should be kept within 20% of $(t_w \cdot L)^{-1}$.

Foregoing described embodiments are provided as illustrations and descriptions only. They are not intended to limit the present disclosure to any precise form described. In particular, it is contemplated that the embodiments described herein may be implemented equivalently in other available functional components or building blocks. Other variations and embodiments are possible in light of above teachings, and it is thus intended that the scope of invention not be limited by this. In the appended claims, the word "comprising" does not exclude other elements, steps or operations, and the indefinite article "a" or "an" does not exclude a plurality. The mere fact that certain measures are recited in mutually different dependent claims does not indicate that a combination of these measures cannot be used to advantage.

What is claimed is:

1. An apparatus for shifting a frequency of an optical signal, comprising:
   a first input port configured to receive the optical signal;
   a second input port configured to receive a pump pulse;
   a wavelength division multiplexer (WDM) coupled to the first input port and the second input port, the WDM being configured to generate a combined signal by combining the optical signal and the pump pulse;
   a nonlinear optical medium configured to pass the combined signal therethrough the nonlinear optical medium having a length L;
   a signal filter configured to receive the combined signal passed through the nonlinear optical medium and to remove the pump pulse from the combined signal but pass the optical signal from the combined signal;
   wherein the pump pulse has a pump energy changing along the length of the nonlinear optical medium, the pump pulse traveling along the nonlinear optical medium at a group velocity that is mismatched with respect to the optical signal by $t_w$ per unit length such that the pump pulse and the optical signal walk-off by a time of $L \cdot t_w$ between an input end and an output end of the nonlinear optical medium;
   wherein the pump pulse has a repetition rate $R_p = (1 \pm 0.1)/L \cdot t_w$ and the pump pulse has a full-width at a half-maximum equal to $\tau_p < 0.2/L \cdot t_w$;
   wherein cross-phase modulation (XPM) results from the pump pulse varying in time with respect to the optical signal due to the pump energy changing along the nonlinear optical medium and the group velocity mismatched between the pump pulse and the optical signal, the XPM causing a time-varying phase shift on the optical signal, the time-varying phase shift being proportional to an energy profile of the pump pulse along the length of the nonlinear optical medium such that a time-varying phase profile is applied to the optical signal, the time-varying phase profile of the optical signal causing a change in a signal spectrum, shifting a portion of an optical power by an amount $|i \cdot R_p|$, where i is an integer.

2. The apparatus of claim 1, wherein the pump pulse has an intensity, and wherein the nonlinear optical medium comprises a nonlinear optical fiber configured to change the intensity of the pump pulse along the nonlinear optical fiber by a magnitude of at least 0.5 dB but less than 10 dB.

3. The apparatus of claim 1, wherein the pump pulse is depolarized such that the phase shift on the optical signal is polarization-independent.

4. The apparatus of claim 1, wherein the pump pulse has a wavelength $\lambda_p$, and the nonlinear optical medium has a dispersion such that the walk-off between the pump pulse and the optical signal is a function of $\lambda_p$ such that $t_w(\lambda_p)$ is changeable by tuning $\lambda_p$, wherein $\lambda_p$ is tuned so that the repetition rate $R_p = (1 \pm 0.1)/L \cdot t_w(\lambda_p)$ of the pump pulse is also tuned.

5. The apparatus of claim 1, wherein the pump pulse has a wavelength $\lambda_p$ changeable between a first value $\lambda_{p,1}$ and a second value $\lambda_{p,2}$, and the nonlinear optical medium has a dispersion such that the walk-off between the pump pulse and the optical signal is a function of $\lambda_p$ such that $t_w(\lambda_p)$ is changeable by tuning $\lambda_p$, wherein at the first value $\lambda_{p,1}$ the walk-off $t_w$ between the pump pulse and the optical signal is a positive number and at the second value $\lambda_{p,2}$ the walk-off $t_w$ between the pump and signal is a negative number, thereby allowing a sign of the phase shift to be controlled by selecting the wavelength of the pump pulse.

6. The apparatus of claim 2, wherein a difference between a maximum phase shift $\phi_{max}$ on the optical signal and a minimum phase shift $\phi_{min}$ on the optical signal is $\phi_{max} - \phi_{min} = i \cdot 2\pi$, thus causing a serrodyne frequency shift where >75% of the energy of the optical signal passed through the signal filter is shifted relative to the frequency of the optical signal at the first input port by a fixed amount of magnitude $|i \cdot R_p|$.

7. The apparatus of claim 2, wherein the nonlinear optical fiber is configured to have a propagation loss leading to a change in the intensity of the pump pulse.

8. The apparatus of claim 2, wherein the nonlinear optical fiber is configured to provide a gain in the intensity of the pump pulse.

9. The apparatus of claim 8, further comprising a Raman pump coupled to the nonlinear optical medium and configured to induce at least partly the gain in the intensity of the pump pulse in the nonlinear optical medium.

10. The apparatus of claim 7, wherein the propagation loss of a wavelength of the pump pulse is larger than the propagation loss of a wavelength of the optical signal.

11. The apparatus of claim 9, wherein the Raman pump is configured to provide an increasing or decreasing pump intensity when the combined signal passes through the nonlinear optical medium, thereby controlling a sign of the phase shift.

12. An apparatus for shifting a frequency of an optical signal, comprising:
a first input port configured to receive the optical signal;
a second input port configured to receive a pump pulse;
a wavelength division multiplexer (WDM) coupled to the first input port and the second input port, the WDM being configured to generate a combined signal by combining the optical signal and the pump pulse;
a nonlinear optical medium configured to pass the combined signal therethrough, the nonlinear optical medium having a length L;
a signal filter configured to receive the combined signal passed through the nonlinear optical medium and remove the pump pulse from the combined signal but pass the optical signal from the combined signal;
wherein
the pump pulse travels along the nonlinear optical medium at a group velocity that is mismatched with respect to the input optical signal such that the pump pulse and the optical signal walk-off by a time of $C \cdot L \cdot t_w$, where $t_w$ is a group velocity mismatch between the pump pulse and the optical signal per unit length, and C is $0.5 \pm 0.1$;
wherein the pump has a repetition rate $R_p = (1 \pm 0.2)/(L \cdot t_w)$;
wherein cross-phase modulation (XPM) resulted from the pump pulse causes a time-varying phase shift on the optical signal such that a nearly temporally symmetric phase shift is induced in the optical signal, thereby causing a nearly symmetric change in a signal spectrum shifting a portion of an optical power by $\pm i \cdot R_p$ where i is an integer.

13. The apparatus of claim 12, wherein the pump pulse is depolarized such that the phase shift on the optical signal is polarization-independent.

14. The apparatus of claim 12, wherein the pump pulse is a short pulse having a pulse-width $\tau_p < 0.1 \cdot L \cdot t_w$, and wherein the nonlinear optical medium is configured such that the pump pulse experiences an amount of loss less than 1 dB when the pump pulse passes through the nonlinear optical medium.

15. The apparatus of claim 12, wherein the pump pulse is a 50% duty cycle square wave resulting in a triangular ramp phase modulation on the optical signal.

16. The apparatus of claim 12, wherein the pump pulse is a pulse having a full-width-at-half maximum between 25-40% of $L \cdot t_w$ causing a sinusoid-like temporal phase shift to be imparted on the optical signal.

17. The apparatus of claim 14, wherein the pump pulse has a pump energy set to cause approximately a $\pi$ phase shift difference between a maximum phase shift and a minimum phase shift of the optical signal.

18. A method for shifting a frequency of an optical signal, comprising:
receiving the optical signal;
receiving a pump pulse;
generating a combined signal by combining the optical signal and the pump pulse;
propagating the combined signal through a nonlinear optical medium; and
removing the pump pulse from the combined signal passed through the nonlinear optical medium, thereby isolating the optical signal from the combined signal;
wherein the pump pulse and the optical signal walk-off each other temporally in the nonlinear optical medium by a time T,
wherein the pump pulse has a repetition frequency set to 1/T,
wherein the pump pulse has a pump energy varying along the nonlinear optical medium such that an intensity of the pump pulse changes by more than 0.5 dB but less than 10 dB, the pump energy being of a magnitude that maximum and minimum cross-phase modulation (XPM) induced by the pump pulse on the optical signal differs by an integer multiple of $2\pi$.

19. The method of claim 18, further comprising providing a gain in the intensity of the pump pulse in the nonlinear optical medium by using a Raman pump.

20. The method of claim 18, wherein each of the pump pulse and the optical signal has a wavelength, and wherein the wavelength of the pump pulse is set to have a loss in dB/km in the nonlinear optical medium that is more than twice as high as a loss of the wavelength of the optical signal in the nonlinear optical medium.

* * * * *